(12) United States Patent
Mugford et al.

(10) Patent No.: US 7,036,459 B1
(45) Date of Patent: May 2, 2006

(54) LEASH ASSEMBLY

(75) Inventors: Roger Mugford, 252 Almners Road, Lyne, Chertsey, Surrey (GB) KT16 0BL; John Fisher, deceased, late of Surrey (GB); by Elizabeth Fisher, legal representative, Great Bookham (GB)

(73) Assignee: Roger Mugford, Surrey (GB)

(*) Notice: Subject to any disclaimer, the term of this patent is extended or adjusted under 35 U.S.C. 154(b) by 0 days.

(21) Appl. No.: 10/110,218

(22) PCT Filed: Oct. 23, 2000

(86) PCT No.: PCT/GB00/04094

§ 371 (c)(1),
(2), (4) Date: Apr. 18, 2003

(87) PCT Pub. No.: WO01/30135

PCT Pub. Date: May 3, 2001

(30) Foreign Application Priority Data

Oct. 22, 1999 (GB) .................................. 9925111

(51) Int. Cl.
*A01K 27/00* (2006.01)
*A01K 89/00* (2006.01)

(52) U.S. Cl. .................. 119/796; 242/306; 242/405

(58) Field of Classification Search ............. 119/796, 119/794, 371, 390, 396.4, 396.7, 396.8, 405; 242/371, 390, 405, 396.7, 396.4, 396.8, 305, 242/306

See application file for complete search history.

(56) References Cited

U.S. PATENT DOCUMENTS

| 3,693,596 | A | | 9/1972 | Croce et al. ............... 119/109 |
| 3,853,283 | A | * | 12/1974 | Croce et al. ............. 242/381.6 |
| 4,344,587 | A | * | 8/1982 | Hildreth .................. 242/390.9 |
| 4,501,230 | A | * | 2/1985 | Talo ........................ 119/796 |
| 4,673,143 | A | * | 6/1987 | Intengan ................. 242/396.9 |
| 4,784,346 | A | * | 11/1988 | Steffan .................... 242/250 |
| 4,932,602 | A | * | 6/1990 | Scott ...................... 242/394.1 |
| 5,377,626 | A | * | 1/1995 | Kilsby et al. .............. 119/796 |
| 5,595,143 | A | * | 1/1997 | Alberti .................... 119/794 |
| 5,954,285 | A | * | 9/1999 | Whisenhunt ............... 242/250 |
| 6,148,773 | A | * | 11/2000 | Bogdahn ................... 119/796 |
| 6,196,489 | B1 | * | 3/2001 | Ma ........................ 242/396.2 |
| 6,467,437 | B1 | * | 10/2002 | Donovan et al. .......... 119/798 |
| 6,474,588 | B1 | * | 11/2002 | Valverde ................ 242/390.2 |
| 6,631,866 | B1 | * | 10/2003 | Obrink et al. ........... 242/390.8 |
| 6,669,134 | B1 | * | 12/2003 | Priest et al. ............. 242/390.8 |
| 6,772,973 | B1 | * | 8/2004 | Fujii et al. ............... 242/390.8 |
| 2003/0025023 | A1 | * | 2/2003 | Rosenfeld ................ 242/395 |

FOREIGN PATENT DOCUMENTS

| DE | 29700971 U1 | 7/1998 |
| EP | 0093445 A1 | 11/1983 |
| GB | 2315660 A | 2/1998 |
| TW | 117941 | 9/1989 |

* cited by examiner

*Primary Examiner*—Yvonne R. Abbott
(74) *Attorney, Agent, or Firm*—Jacobsn Holman PLLC

(57) ABSTRACT

A leash assembly includes a body with a handle and a cord which has an end captive in the body. The assembly is adjustable whereby the tension in the cord can be caused automatically to increase and decrease respectively causing a shudder in the cord. Optionally, a noise my accompany the change in tension in the cord. The leash will be attached in use to a collar or harness worn, for example, by a dog and the shudder is used to assist in training the animal.

9 Claims, 2 Drawing Sheets

LEASH ASSEMBLY

This invention relates to a leash assembly.

Leash assemblies are known which are extensible and which include a reel around which a cord is wrapped and which have a rewind spring on the reel for retracting the cord. The reel generally has a ring of ramps which cooperate with a stop element which can be engaged with the ramps to stop the reel turning in the direction in which the cord would be pulled out of the body while permitting the rewind spring to retract the cord when the stop element is released.

In German patent no. DE29700971 lateral spring loading of the reel is used to decrease any noise the leash assembly makes in use.

According to the present invention there is provided a leash assembly comprising:
a body with a handle and a cord having an end captive in the body, characterised in that:
  the assembly includes means whereby the tension in the cord can be caused to repetitively increase and decrease causing a shudder in the cord.

The means for altering the tension in the cord can be mechanical means or battery operated means, for example, driven by a battery-operated electric motor. Repetitive alterations in tension in the cord are further modified by an additional electronically generated intermittent noise.

An embodiment of the present invention whereby the means for altering tension is mechanical will now be described in more detail, by way of example, with reference to the drawings, in which.

Figure 1:
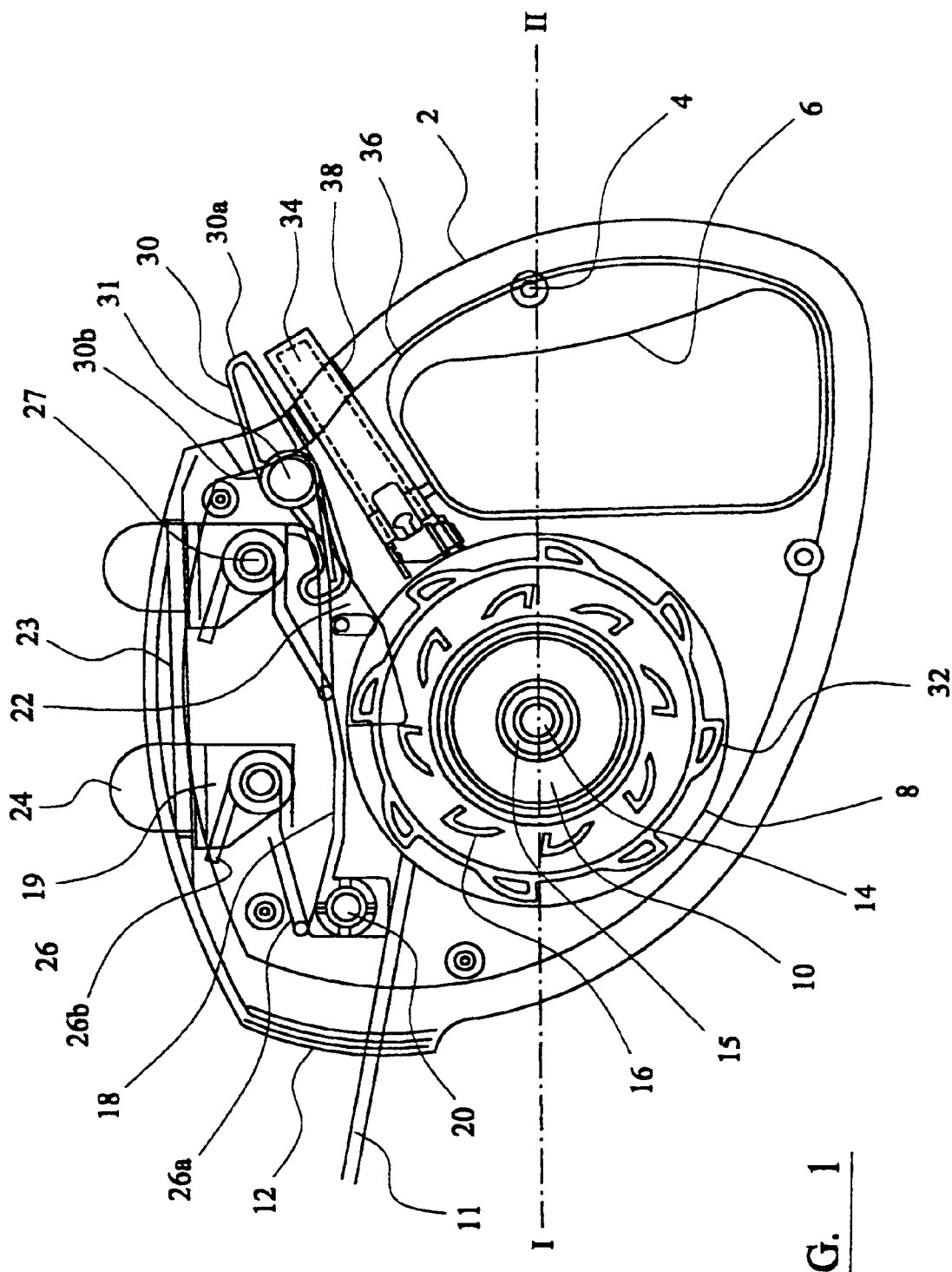
FIG. 1 is a section through a leash assembly between the two complementary parts of the body.
Figure 2:
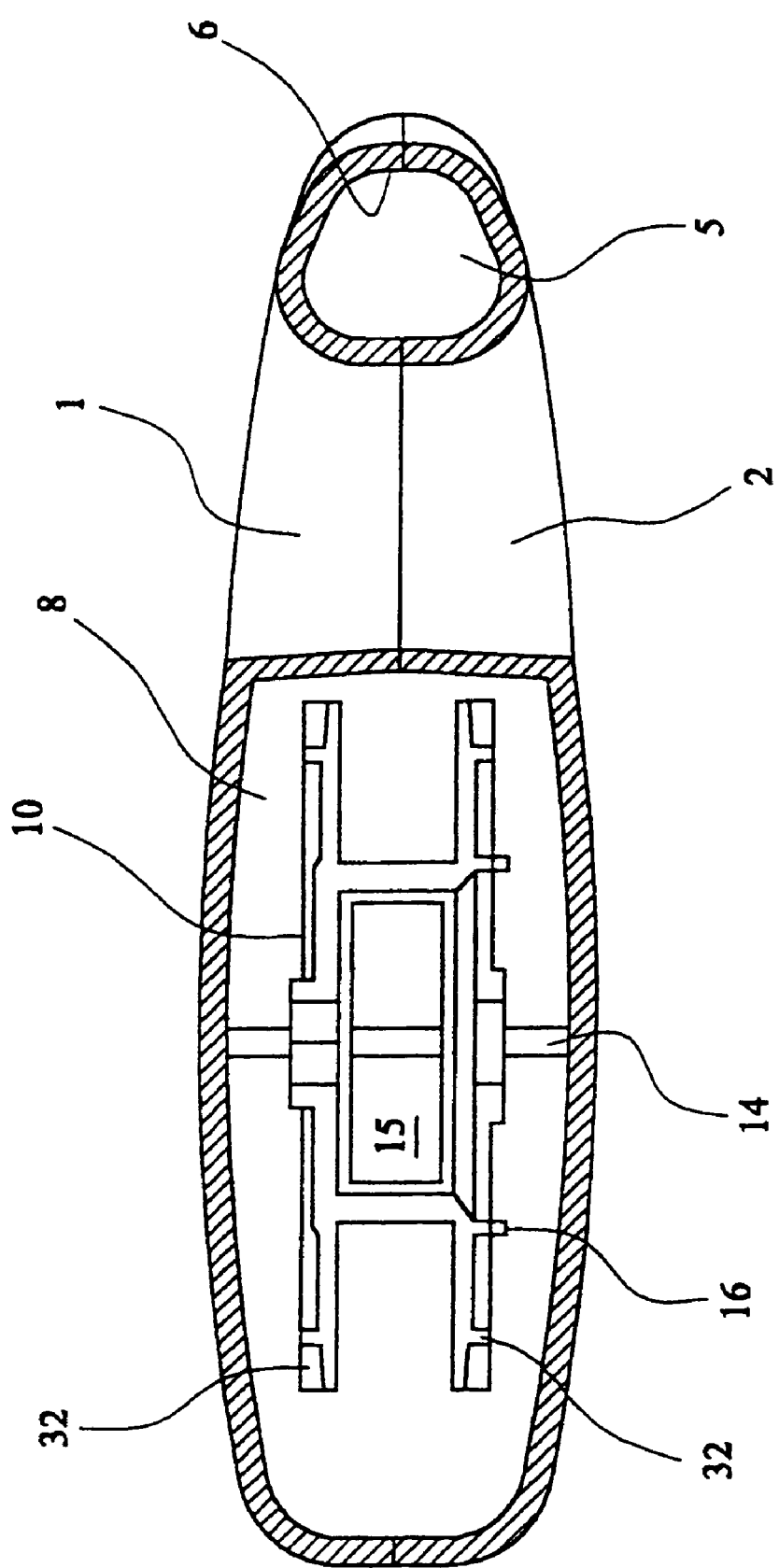
FIG. 2 is a cross section through the leash assembly on the line II to II of FIG. 1 with the cord omitted.

The leash assembly shown in the drawings comprises a body, formed by two complementary plastic mouldings 1 and 2 held together by screws 4. The body is formed with an opening 5 to form a handle 6 and defines a cavity 8 for containing a reel 10 on which is wound the greater part of a length of cord 11 which extends out of the body through an aperture 12 formed between the two complementary parts of the body, at the end of the body opposite to the handle. The outer end of the cord carries a clip assembly (not shown) for attachment to a dogs collar. The body part moulding carries a moulded post 14 extending into an indent moulded in the opposing wall. The reel 10 is rotatably mounted on the post 14. A spiral rewind spring 15 acts between the reel 10 and the post 14 for retracting the cord around the reel.

One side cheek of the reel is moulded with a ring of first ramps 16, which are evenly spaced about the circumference of the reel. A pawl 18 is pivotally mounted at one end on pins 20 moulded in the body parts and has a nose 22 for engaging the ramps 16. The first ramps 16 are so orientated that when the cord is pulled out of the body the nose of the pawl can ride over the ramps 16.

A slider 19 is slidable along a slot 23 which is formed between the two complementary parts of the body above the pawl and reel. The slider carries a button 24 which enables the user to move the slider 19 along the top of the body. A helically coiled spring 26, with arms 26a and 26b at each end is located on a peg 27 on the slider. An arm 26a depending from the spring 26 bears on the arm of the pawl 18. In the position shown in FIG. 1, one end of the spring 26a engages the pawl arm at a position to the left of the pivotal axis of the pawl and thus holds the pawl out of engagement with the ring of first ramps 16. As the slider is moved to the right in FIG. 1 across from the pivot of the pawl, the spring urges the nose of the pawl into contact with the ramps 16. The further the slider is moved away from the pivoted end of the pawl the greater is the torque exerted on the pawl and thus the greater is the force of engagement of the nose of the pawl with the ramps 16.

A disengager lever 30 is pivoted on a post 31 and has an end 30a projecting from the body which, when depressed against the action of a spring 30b, lifts the pawl out of engagement with the ramps, enabling the cord to be pulled freely from the reel against the torque exerted by the rewind spring 15.

Each cheek of the reel is moulded with a ring of second ramps 32; the second ramps 32 are angled in the opposite direction to the first ramps 16. A brake member 34 is biassed by a spring so that it is urged to project outwards through a gap between the two body parts. The inner part of the brake member 34 extends inwards towards the ramps of the second ring 32 so that, when depressed by the user, it engages the step of one of the ramps, stopping the reel 10 from rotating and the cord 11 from unwinding. When the brake member is released, the rewind spring can rotate the reel to rewind the cord.

In use, the leash assembly is held by the handle 6, and the cord 11 extending out of the body of the assembly is attached by its clip to a collar or harness worn by a dog. When the slider 19 is in the furthest position to the left in FIG. 1, the reel 10 is free to rotate, provided the brake member 34 is released. The dog is free to move away from the holder of the assembly and by pulling on the cord 11 can unwind the cord from the reel 10 until the furthest extent of the cord is unwound.

When the dog stops pulling on the lead, or the user and the dog move closer together, the rewind spring 15 acts on the reel 10, rewinding the cord around the reel and pulling in any slack cord from between the holder of the assembly and the dog.

When the slider 19 is in the position to the right in FIG. 1 (the "maximum" position), the nose of the pawl 22 strongly engages the ramps 16, effectively preventing the reel from rotating. Therefore, the cord is kept at a fixed length. When the dog pulls on the cord, the cord does not extend and the pull is exerted on the holder of the leash assembly.

When the slider 19 is positioned between the "free" position and the "maximum" position the force of engagement between the nose of the pawl 22 and the first ring ramps of the reel 16 varies with position. When the slider 19 is nearer the "free" position, there is only a slight engagement of the nose of the pawl 22 and the ramps 16. This engagement is stronger nearer the maximum position. The engagement of the nose of the pawl 22 and the ramps 16 between these positions is such that if the dog pulls on the cord, the nose of the pawl resiliently engages the incline of the ramp causing increased tension in the cord which drops as the nose of the pawl drops over the edge of the ramp. This repeats as the nose of the pawl engages the next ramp. The alterations in tension are proportional to the force of engagement of the pawl and the ramps.

The resultant repetitive alterations in tension in the cord cause a "shudder" effect on the collar or harness worn by the dog. The dog cannot lean against the tension in the cord and stops pulling. The amount of alteration of tension in the cord can be adjusted according to the position of the slider 19. For a stronger animal a larger variation in tension could be provided than for a less strong animal. The engagement of the nose of the pawl and ring of first ramps preferably makes a clicking noise, audible to the dog or to the dog and the trainer, as the nose of the pawl drops over the edge of each ramp. For example, the nose of the pawl and the ring of ramps are made of metal or a hard plastics material. This clicking noise alarms the animal and aids the training.

When the means to provide alterations in tension in the lead is battery-operated means, for example, driven by a battery-operated electric motor, the alterations in tension can be accompanied by an electronically-generated intermittent noise. This noise can be synchronised with the repetitive alterations in tension in the cord.

The cord of the leash assembly can be held at a required length, when in the maximum position or when the brake is applied, so it engages the second ring of ramps. Alternatively the leash assembly can be used as a conventional extensible lead with the slider 19 in the "free" position shown in FIG. 1. However, adjustment of the position of the slider, causing alterations in the tension in the cord means the leash assembly can be used as a training device to prevent animals from pulling on a lead.

The invention claimed is:

1. A leash assembly comprising:
   a body with a handle and a cord having an end captive in the body,
   means whereby the tension in the cord is caused repetitively to increase and decrease causing a shudder in the cord, the respective alterations in tension in the cord being accompanied by an audible intermittent signal, the means to cause the repetitive alterations in tension in the cord being driven by a battery operated electric motor, the repetitive alterations in tension in the cord being accompanied by an electronically-generated intermittent noise.

2. The leash assembly according to claim 1, wherein a magnitude of repetitive alterations in tension in the cord is adjustable.

3. The leash assembly according to claim 1, wherein the noise is synchronised with the repetitive alterations in tension.

4. A leash assembly comprising:
   a body with a handle and a cord having an end captive in the body, means whereby the tension in the cord is caused repetitively to increase and decrease causing a shudder in the cord, a reel around which the cord is wrapped, the reel having a ring of ramps and being mounted in the body for rotation when the cord is pulled from the reel and having a rewind spring for urging the reel to rewind the cord, a pawl which can contact the ramps as the reel rotates and resilient means for urging the pawl into contact with the ramps, the ramps of the reel being so orientated that when the cord is pulled out of the body the nose of the pawl rides over the ramps; the arrangement being such that while the pawl noise is in resilient engagement with an incline of a ramp, the tension in the cord increases but drops as the noise drops off the edge of the ramp.

5. The leash assembly according to claim 4, wherein a force of engagement of the pawl with the ramps of the reel is adjustable.

6. The leash assembly according to claim 4, wherein a force of engagement of the pawl with the ramps of the reel can be adjusted by movement of a slider.

7. The leash assembly according to claim 6, wherein the pawl is formed by an arm pivotally mounted in the body, the resilient means is carried by the slider so that the location of the engagement of the resilient means with the pawl is determined by the slider.

8. The leash assembly according to claim 4, wherein the pawl and the ramps of the reel are made of materials such that riding of the pawl over the ramps causes a clicking noise.

9. The leash assembly according to claim 4, wherein a second ring of ramps on the reel faces in the opposite direction to the first ring of ramps and a stop member is moveable against a resilient bias to engage the second ring of ramps to act as a brake.

\* \* \* \* \*